United States Patent
Hsiao et al.

[11] Patent Number: 5,915,035
[45] Date of Patent: Jun. 22, 1999

[54] METHOD FOR EXTRACTING HIGH-LEVEL FEATURES FOR FINGERPRINT RECOGNITION

[75] Inventors: Pei-Yung Hsiao, Taipei; Shu-Fang Hsu, Chu-Nan, both of Taiwan

[73] Assignee: Aetex Biometric Corporation, Taipei, Taiwan

[21] Appl. No.: 08/788,995

[22] Filed: Jan. 27, 1997

[51] Int. Cl.$^6$ .................................................. G06K 9/00
[52] U.S. Cl. .......................... 382/125; 382/205; 382/279
[58] Field of Search ...................................... 382/124, 125, 382/126, 127, 205, 279; 356/71; 396/101

[56] References Cited

U.S. PATENT DOCUMENTS

| | | | |
|---|---|---|---|
| 3,419,287 | 12/1968 | Rudie | 356/71 |
| 4,607,384 | 8/1986 | Brooks | 382/124 |
| 4,724,544 | 2/1988 | Matsumoto | 382/205 |
| 4,933,976 | 6/1990 | Fishbine et al. | 382/127 |
| 5,040,224 | 8/1991 | Hara | 382/124 |
| 5,128,706 | 7/1992 | Shindo et al. | 396/101 |
| 5,140,642 | 8/1992 | Hsu et al. | 382/124 |
| 5,233,670 | 8/1993 | Dufour et al. | 382/205 |
| 5,438,636 | 8/1995 | Surka | 382/279 |
| 5,497,429 | 3/1996 | Shibuya | 382/125 |
| 5,572,597 | 11/1996 | Chang et al. | 382/125 |
| 5,659,626 | 8/1997 | Ort et al. | 382/125 |

*Primary Examiner*—Joseph Mancuso
*Assistant Examiner*—Gilberto Frederick, II

[57] ABSTRACT

A method to extract automatic high level features of a gray level ridge flow image including the automatic determination of the location of the high level features including the core and delta points of a fingerprint image in the form of a gray level image, comprising the following five steps:

(1) determining a ridge flow direction of each gray level pixel of a fingerprint image and assign it with a direction code;

(2) finding out a block directional flow and assigning each with appropriate direction code thereof;

(3) correcting block flow directions in which a detection of the flow direction is affected image an input image quality in order to be immune from noises infiltrated during the acquiring process;

(4) locating the delta points which are based on a corrected block direction flow diagram to locate from zero to a few delta points; and (5) locating the core points which are based on a corrected block direction flow diagram to locate one to two core points.

5 Claims, 11 Drawing Sheets

| p-2,q-2 | p-2,q-1 | p-2,q | p-2,q+1 | p-2,q+2 |
|---------|---------|-------|---------|---------|
| p-1,q-2 | p-1,q-1 | p-1,q | p-1,q+1 | p-1,q+2 |
| p,q-2   | p,q-1   | p,q   | p,q+1   | p,q+2   |
| p+1,q-2 | p+1,q-1 | p+1,q | p+1,q+1 | p+1,q+2 |
| p+2,q-2 | p+2,q-1 | p+2,q | p+2,q+1 | p+2,q+2 |

| 2 | 2 | 2 | 2 | 2 |
|---|---|---|---|---|
| 2 | 1 | 1 | 1 | 2 |
| 2 | 1 | 0 | 1 | 2 |
| 2 | 1 | 1 | 1 | 2 |
| 2 | 2 | 2 | 2 | 2 |

METHOD FOR EXTRACTING HIGH-LEVEL FEATURES FOR FINGERPRINT RECOGNITION

BACKGROUND OF THE INVENTION

In fingerprint recognition, there are two classes of characteristic points: (1) high-level features which include 0 to a few deltas and 1 to 2 cores; (2) low-level features which include the ending points and the bifurcation points.

Since the ridge-flow orientation of a fingerprint at a feature point will be different from the orientation of other part of the image, it can be relied on to determine the high-level features of the fingerprint. In fact, when an expert is identifying a fingerprint, the first characteristics being observed are these two characteristic points of the high-level features. As such, these features cannot be ignored in the development of an automatic fingerprint recognition system.

Each fingerprint may have a different number of core points and deltas. Therefore determining the high-level feature points will help make initial classifications for the fingerprints. However, as a major difficulty to the automatic fingerprint recognition, the fingerprint image acquired (for the same finger) may be different from each input of the image. This is because during each fingerprint acquisition, a person may either press his finger with different strength or in a different orientation that his fingerprint may be distorted. Therefore to re-orientate the fingerprint image and identify its location, such as using the cluster of core points and deltas as the basis, to simplify the recognition process and to improve the rate of recognition has become a principal object in automatic fingerprint recognition.

However, reviewing the conventional known technique, it can only determine one core point (a dual whole fingerprint has two core points), and cannot determine any delta point. Besides, it only divides the fingerprint ridge flow into four directions after the processing, which is not precise and can not determine the core point location so precisely.

U.S. Pat. No. 5,140,642 to Hsu et al. disclosed a method to automatically find out the actual position of the core point of a finger print by using the characteristics of the ridge flow of fingerprint. However, it also does not disclose a method to determine the delta points, thereby still being unsatisfactory for a precise recognition of fingerprints.

SUMMARY OF THE INVENTION

The object of this invention is to precisely determine the high-level feature points including 1 to 2 core points and 0 to a few delta points from any fingerprint. This method is able to determine the same high-level features including the core points and deltas, even if the fingerprint is acquired at different time, distorted due to different pressure, transformed or disoriented sensing.

From the distribution of core points and deltas, which are determined based on the ridge-flow direction, it is possible to extract the high-level feature points location, serving for a well classification of fingerprints.

DETAILED DESCRIPTION

In the present invention, an algorithm can be divided into five steps to explain how the core points and delta feature points are determined:

1. Using new method to obtain the direction-flow image from the initial gray-level image;
2. Using new method to obtain the block direction-flow image;
3. Applying the new smoothing algorithm;
4. Determining the (0 to a few) deltas with new method; and
5. Determining the (1 to 2) core points with new method.

Figure 1:
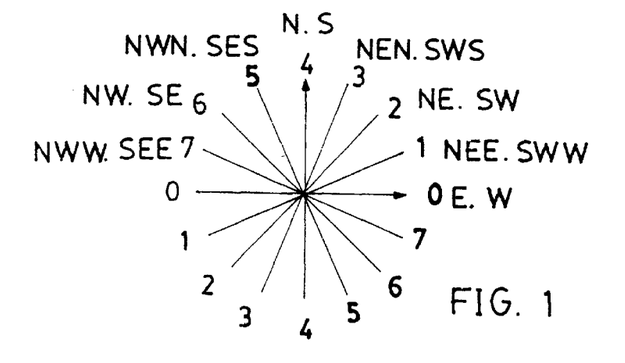
FIG. 1 shows 8 codes for different flow directions in accordance with the present invention.

These steps are hereby described in detail as follows:

1. Obtaining the direction-flow image from initial gray-level image:

The initial image of the fingerprint is a gray-level image. To obtain the direction-flow image from the gray-level image, it is necessary to analyze the gray-levels surrounding each pixel to determine the flow direction of that pixel. The present invention labels the directions as 0, 1, ..., N−1, where N=8, i.e., there are altogether 8 directions. The flow directions and their corresponding labels are shown in FIG. 1.

Figure 2:
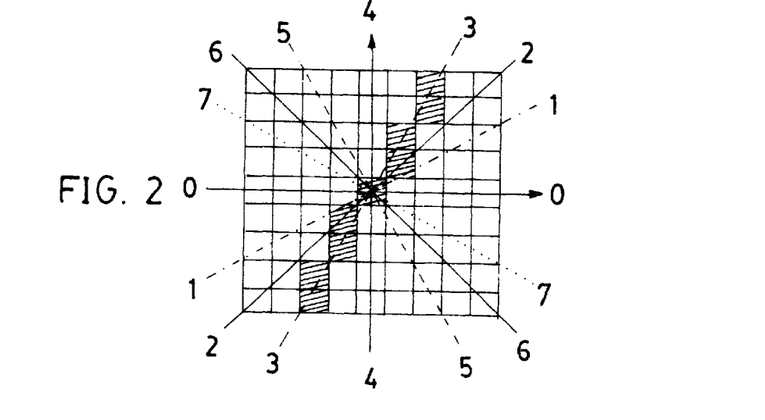
FIG. 2 shows a novel scheme to determine the direction of a pixel (using a 9×9 mask and direction code 3 as example here) in accordance with the present invention.

Assuming that the size of the initial gray-level image is M×M, the direction of a pixel is determined based on a scheme as illustrated in FIG. 2. First of all, taking the pixel (i, j) as the center, we define a P×P region (mask) and calculate the change in gray-level along each direction. The direction, D(i, j), which has the minimum change in gray-level is taken as the direction of the pixel. FIG. 2 shows such calculation for a 9×9 mask (i.e., P=9) and assigned direction code 3 to the pixel at the center. Equation 1.a and 1.b gives the formula to determine the direction of each pixel.

$$D(i, j) = \text{Min}\{V_d(i, j) \mid d = 0, 1, ..., N-1\} \quad (1.a)$$

$$V_d(i, j) = \sum_{\substack{t=-m \\ t \neq 0}}^{m} |G_d(i_t, j_t) - G(i, j)| \quad (1.b)$$

where D(i,j) is the direction for the pixel (i,j). i,j=0, 1, ..., M−1

$V_d(i,j)$ is the change in gray-level, from pixel (i,j), along the direction d, and d=0, 1, ..., N−1.

G(i,j) is the gray-level of pixel (i,j) in the initial fingerprint image.

G(i,j) is the gray-level of pixel (i,j) in the initial fingerprint image.

$G_d(i_t,j_t)$ as the gray-level value of the $t^{th}$ pixel from pixel (i,j) along the direction d. The value is filtered by the 9×9 mask. t=−m, ..., m and t 0.

m is extension (in terms of pixel number towards both sides) from (i,j) along direction d in determining the direction.

The method described above can calculate the direction of each pixel (i,j), thus obtaining the direction-flow image of the entire fingerprint gray-level image.

2. Obtaining the block direction-flow image (BDI):

After obtaining the direction-flow image using the method described above, it is necessary to gather the general flow of the fingerprint to facilitate the determination of the core points and deltas. From the curvature of the direction-flow, the procedures in the later stage of this invention can determine the number and the position of the core points and deltas. There may be 1 to 2 core points and 0 to a few deltas.

Referring to Eq. (1), since the direction-flow image is determined by the calculations for each pixel, it is easily disturbed by noises. As such we derive an averaged block direction-flow image (BDI) from the direction-flow image to reduce the effects of noise. The BDI is a better basis to determine the general flow of the fingerprint, thereby being advantageous to locate the core points and deltas.

This invention converts the original M×M direction-flow image to a M/b×M/b block direction-flow image (here we take b=8). That is to obtain the average value, BDI(.), of the direction code for the b² direction codes in the b×b subregion. The average value is calculated with following equation:

$$BDI(p,q)=k \text{ and } h_k=h_{max}=MaxH_{pq}=Max\{h_d \mid d=0, 1, ..., N-1\} \quad (2)$$

where $h_d$ represents the number of pixels among the b² direction codes in region (p, q) having the same direction d.

Conceptually, the above is to determine the direction k(0≤k≤N−1) which has the highest frequency in the subregion of the original direction-flow image. This direction BDI(p,q), is then assigned as the direction of the block.

3. Applying the smoothing algorithm:

Sometimes the block direction-flow image may be poor in quality or affected by stains on the finger. It is therefore necessary to perform automatic correction. We call this process smoothing.

From observations, the direction-flow of a fingerprint is rather smooth, except at the area around the core points and the deltas. This characteristic can be served as a reference whether to correct the direction of an area. On the other hand, the flow at areas around the core points and the deltas cannot be perturbed due to the smoothing process. This invention suggests a new method can consider this dilemma and is able to achieve a good result in smoothing the block direction-flow image.

Figure 3:
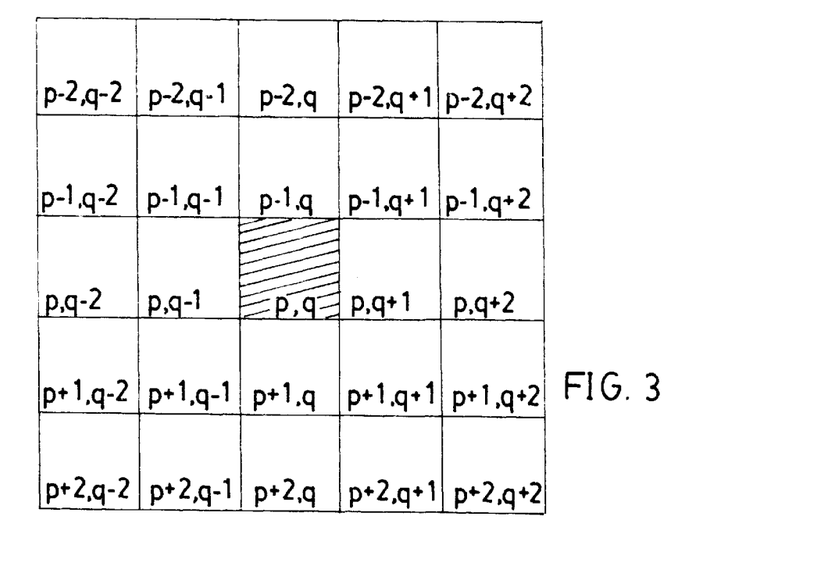
FIG. 3 shows a 5×5 region, $R_{5\times 5}(p, q)$, to decide whether to apply smoothing on the BDI.

For each block (p, q), our smoothing method applies a 5×5 block-region, $R_{5\times5}(p,q)$, taking the block as the center (see FIG. 3), and calculate the ratio of the directions within the region. The smoothing is based on this ratio. The calculation is shown below:

We shall define $$\overline{H}(R_{5\times5}(p,q))=\{\overline{h}_d \mid d=0, 1, ..., N-1\} \quad (3)$$

where $\overline{h}_d$ is the number of blocks having the direction d, within the 5×5 area $R_{5\times5}(p,q)$, where (p,q) is the center of the area.

Next, $$\overline{H}^{45°}(R_{5\times5}(p,q))=\{\overline{h}_d^{45°} \mid d=0, 1, ..., N-1\} \quad (4)$$

where $\overline{h}_d^{45°}$ is the number of occupied blocks within the 45° sector, taking direction d as the reference axis.

Then whether BDI(p,q) is to be corrected depends on the following three considerations:

(1) the number of blocks with direction $\overline{h}_{\overline{k}}$, where $\overline{h}_{\overline{k}}$=Max $\overline{H}$=Max$\{\overline{h}_d \mid d=0, 1, ..., N-1\}$ (2) the number of blocks with direction $\overline{h}_d^{45°}$, where $\overline{h}_d^{45°}$=Max$\overline{H}^{45°}$=Max$\{\overline{h}_d^{45°} \mid d=1, 2, ..., N-1\}$ (3) the angular difference between BDI(p,q) and $\overline{k}$.

Figure 4A:
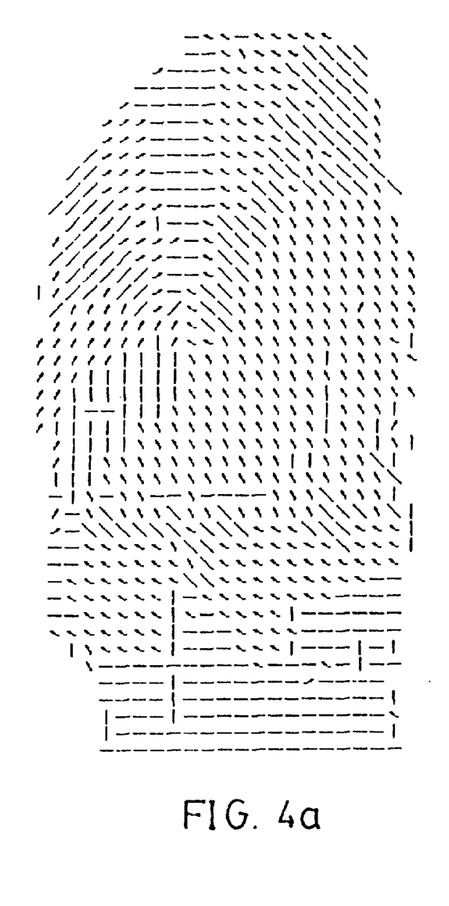
FIG. 4a shows an application of smoothing method before smoothing BDI.
Figure 4B:
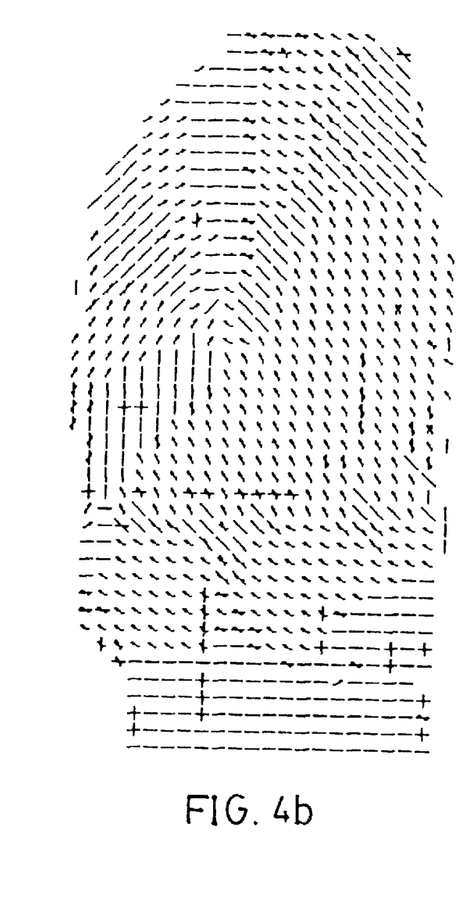
FIG. 4b shows the smoothing method after smoothing BDI.

FIGS. 4(a) and 4(b) show the results of applying this method and it is obviously very effective.

Figure 5:
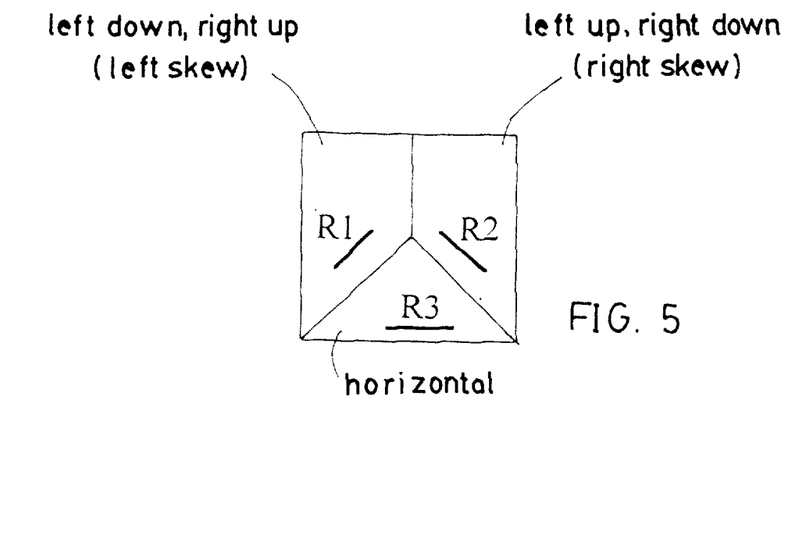
FIG. 5 shows the direction-flow distribution in neighboring blocks of a delta point.
Figure 6:
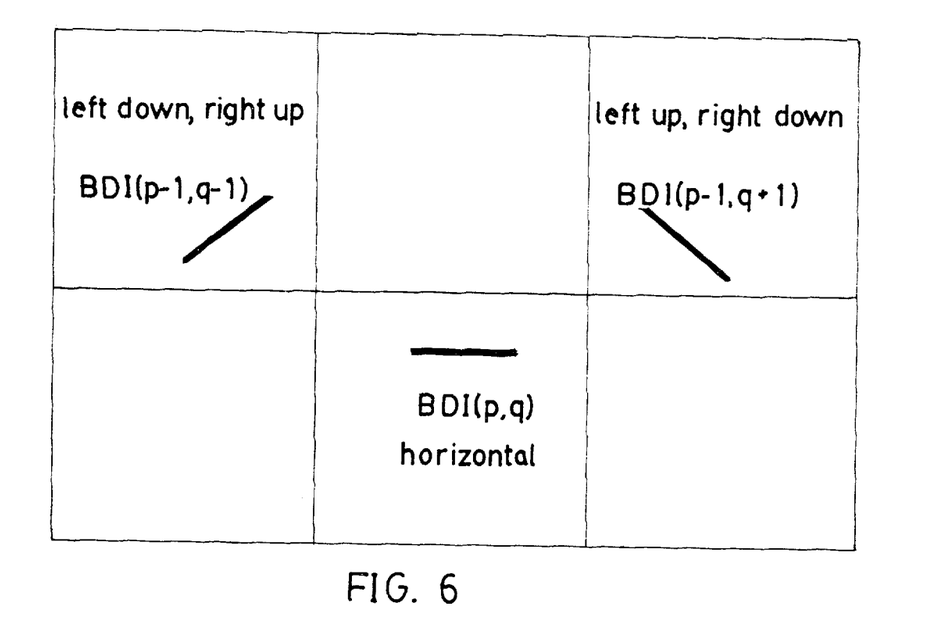
FIG. 6 shows the left-top and right-top corner block directions for the (p, q) block.

4. Determining the deltas:

Analyzing the areas around the deltas, we discovered that they have a common flow characteristic as illustrated in FIG. 5. That is, the blocks surrounding a delta will have a flow distribution as shown in FIG. 5. In the R1 region, the flow directions observe a left skew (left down, right up) direction; in the R2 region, the flow directions observe a right skew (right down, left up) direction; whereas in the R3 region, the flow directions observe a horizontal direction. Based upon this observation, the present invention improvises a new method to locate the blocks where the deltas are. Details of this method are described in the following five steps:

Step 1: Taking (p, q) as the center of the current block (refer to FIG. 6), check whether the flow direction of the left-top corner block, BDI(p−1, q−1), is in the left skew direction. Also check whether the flow direction of the right-top corner block, BDI(p−1, q+1), is in the right skew direction.

Figure 7:
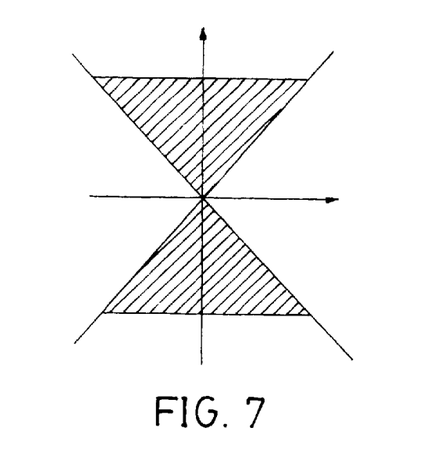
FIG. 7 shows region considered to have a vertical direction-flow.

Step 2: Taking (p, q) as the center, take a 5×5 block-region and count the number of blocks with vertical flow direction (all directions encompassed by the shaded area shown in FIG. 7 are considered as vertical flow direction). The analysis will continue only if this number exceeds a pre-determined threshold value. The purpose here is to filter off the areas further away from the delta point where the flow directions may be more or less similar to that in R1, R2 and R3 shown in FIG. 5. In those areas, the flow inclination (R1 or R2) are not large enough and can be discarded.

Figure 8A:
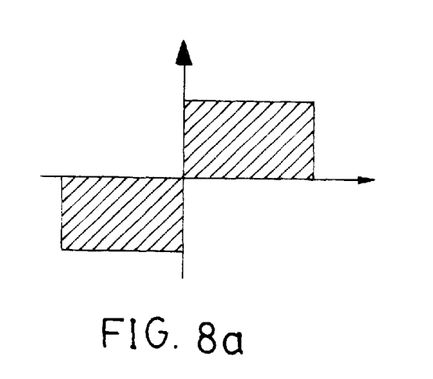
FIG. 8a shows left-skew region.
Figure 8B:
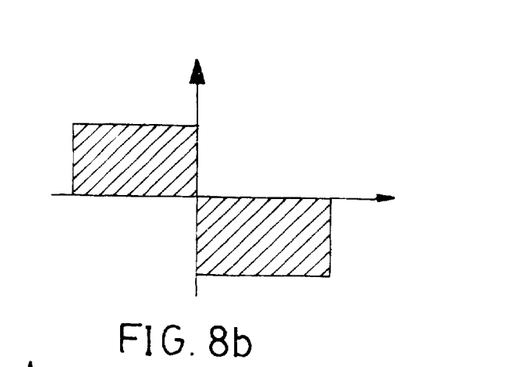
FIG. 8b shows right-skew region.
Figure 8C:
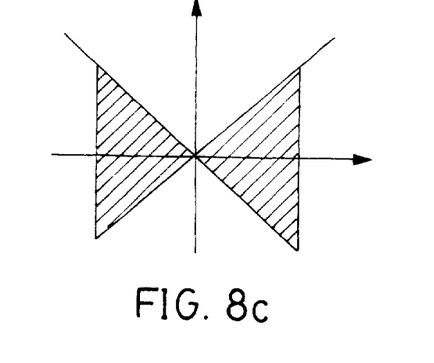
FIG. 8c shows horizontal region.

Step 3: As shown in FIGS. 8a, 8b and 8c, having defined the left skew, right skew and horizontal directional variations, the next three rules are considered to confirm whether the R1, R2 and R3 regions around block (p, q) have the same characteristic as shown in FIG. 5.
Rule 1:

Let the number of left skew in the R1 region be Left(R1), the number of right skew in region R1 be Right(R1), and the number of horizontal in region R1 be Horizon(R1). If the following condition is met, then R1 is assumed to be left skew:

(1) Left(R1)>threshold$_0$ (a pre-assigned value)
(2) Left(R1)>Right(R1) and Left(R1)>Horizon(R1)
Rule 2:

Let the number of left skew in the R2 region be Left(R2), the number of right skew in region R2 be Right(R2), and the number of horizontal in region R2 be Horizon(R2). If the following condition is met, then R2 is assumed to be right skew:

(1) Right(R2)>threshold, (a pre-assigned value)
(2) Right(R2)>Left(R2) and Right(R2)>Horizon(R2)
Rule 3:

Let the number of left skew in the R3 region be Left(R3), the number of right skew in region R3 be Right(R3), and the number of horizontal in region R3 be Horizon(R3). If the following condition is met, then R3 is assumed to be horizontal:

(1) Horizon(R3)>threshold$_2$ (a pre-assigned value)
(2) Horizon(R3)>Left(R3) and Horizon(R3)>Right(R3)

If all Rules 1, 2 and 3 are satisfied, then the block (p, q) is a candidate delta location.

Step 4: After identifying the candidate delta locations in Step 3, we need to determine the number of clusters among them. The total number of clusters will be the number of delta points.

Figure 9:
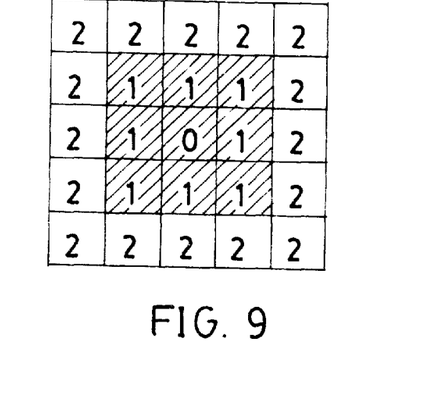
FIG. 9 shows calculation of distance between core point and other points.

Here an improved K-means clustering algorithm is applied. In the original K-means clustering algorithm, it is required to fix and assume a number of clusters. However, it is impossible to predict the number of clusters, i.e. the number of delta points, at the beginning. Therefore we begin by assuming that there is one cluster, if the new point added to the cluster has a distance greater than Distance (Distance is a pre-determined value) from the cluster center, then this new point is assigned to a new cluster. The distance mentioned above is measured using the chess board measure as illustrated in FIG. 9 in which each of the 8 neighboring points around a given center point has the same distance from the center point.

Step 5: Similarly, for each cluster determined in previous step, a representative point has to be determined and to be regarded as the actual delta point.

Suppose the $C^{th}$ cluster has altogether q points. For any point v corresponding to a vector (Left(R1)$|_v$, Right(R2)$|_v$, Horizon (R3)$|_v$, where v=1, 2, . . . , q, which obeys the Rules 1, 2 and 3 in Step 3, there exists a point u∈{1, 2, . . . , q} that satisfies the following:

Left(R1)$|_u$ ≧ Left(R1)$|_{v\,u}$
and Right(R2)$|_u$ ≧ Left(R2)$|_{v\,u}$
and Horizon(R3)$|_u$ ≧ Horizon(R3)$|_{v\,u}$ Under such condition, u is the actual location of the delta point within cluster C.

5. Determining the cores:

The nature of distribution of the core points is different from that of the delta points. However, the analysis to locate them is similar. That is to take a small area around the candidate core points for further dividing the small area in order to analyze the direction flow in each of the small area.

Figure 10:
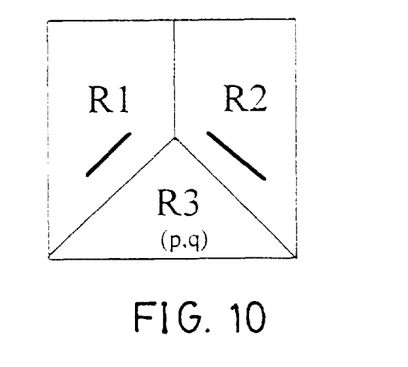
FIG. 10 shows first flow characteristics of a core point.
Figure 11:
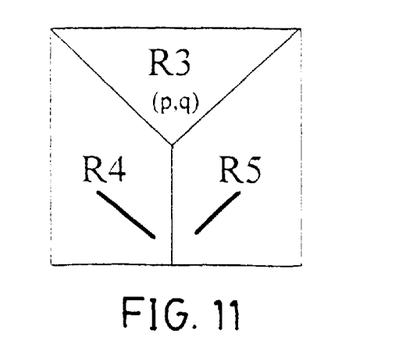
FIG. 11 shows second flow characteristics of a core point.
Figure 12A:
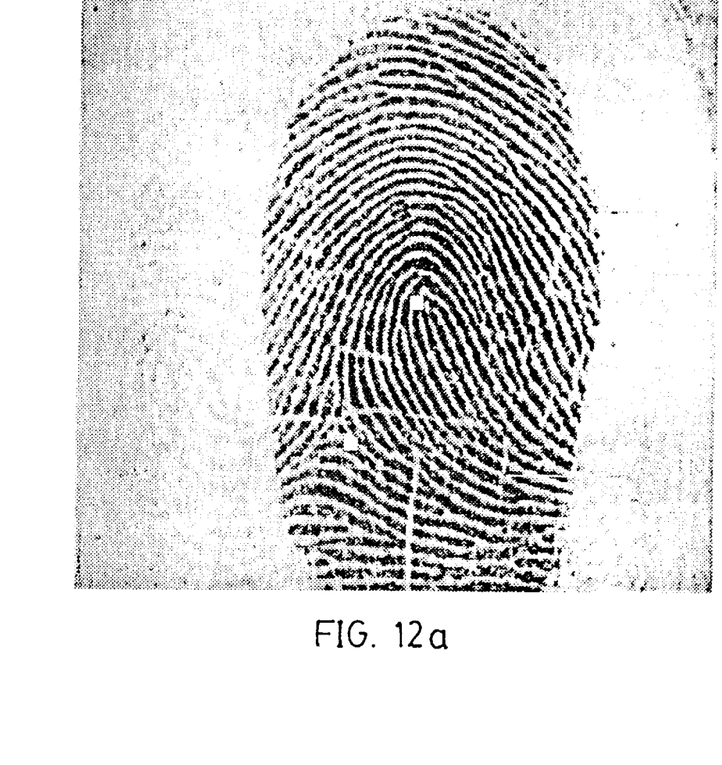
FIG. 12a shows first acquired image of fingerprint 1: original gray-level image.
Figure 12B:
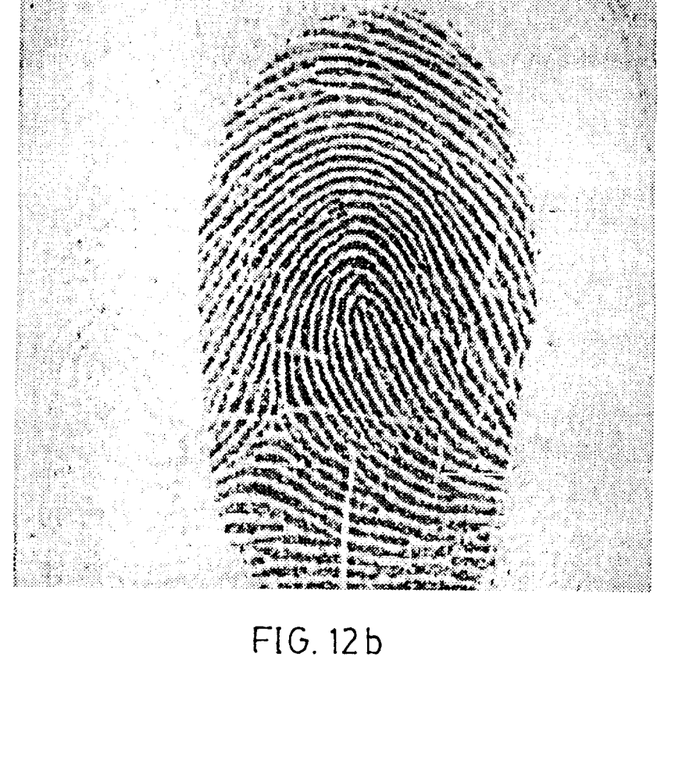
FIG. 12b shows block direction-flow image obtained after applying Step 1 and 2 of this invention.
Figure 12C:
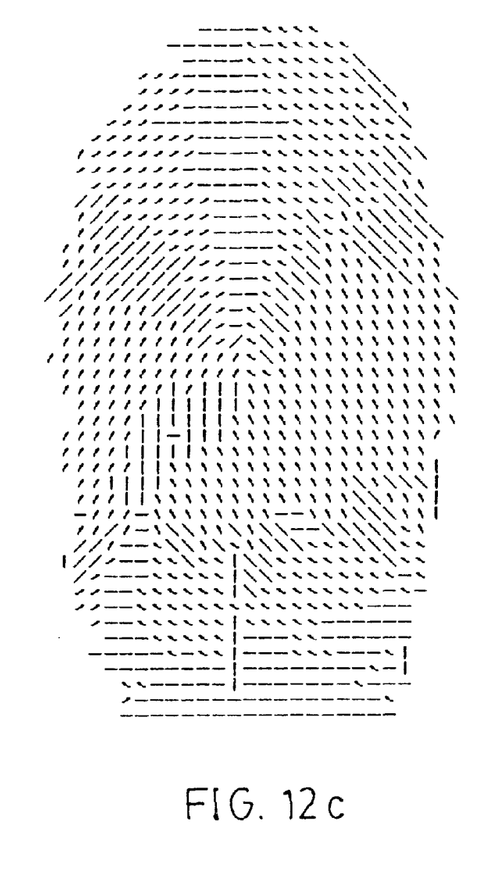
FIG. 12c shows block direction-flow image obtained after applying Step 3 of this invention, the core point and delta point positions obtained by Step 4 and 5 are indicated with inverse (color) block FIG. 12d indicates the core point and delta point on the original gray-level image.
Figure 12D:
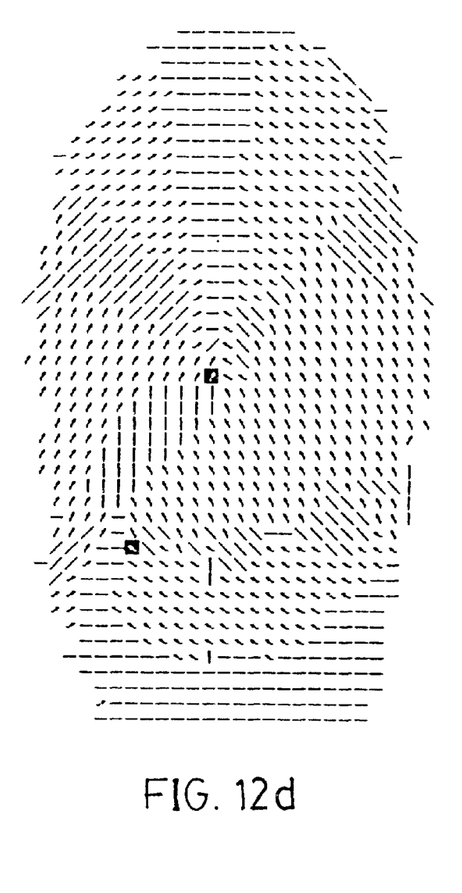
Figure 13A:
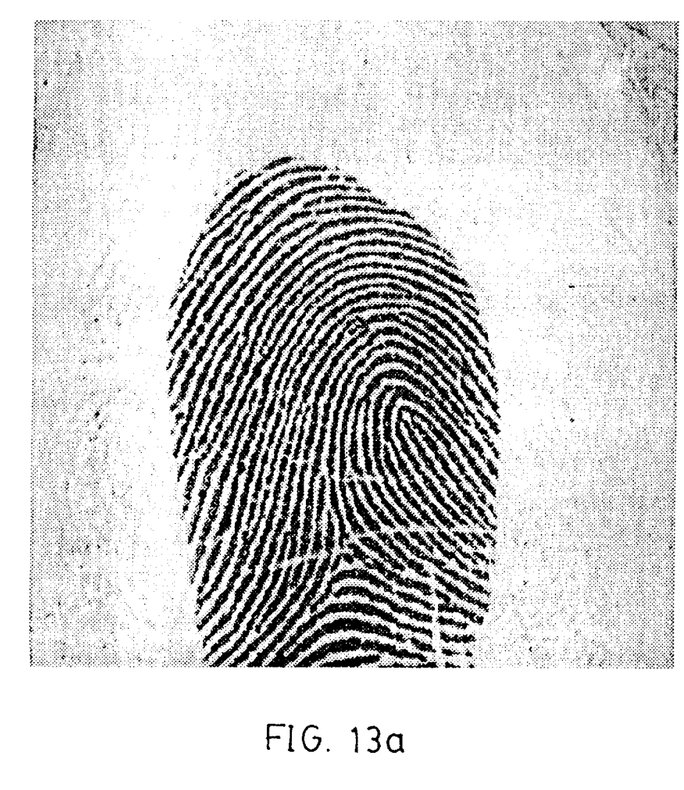
FIG. 13a shows second acquired image of fingerprint 1: original gray-level image.
Figure 13B:
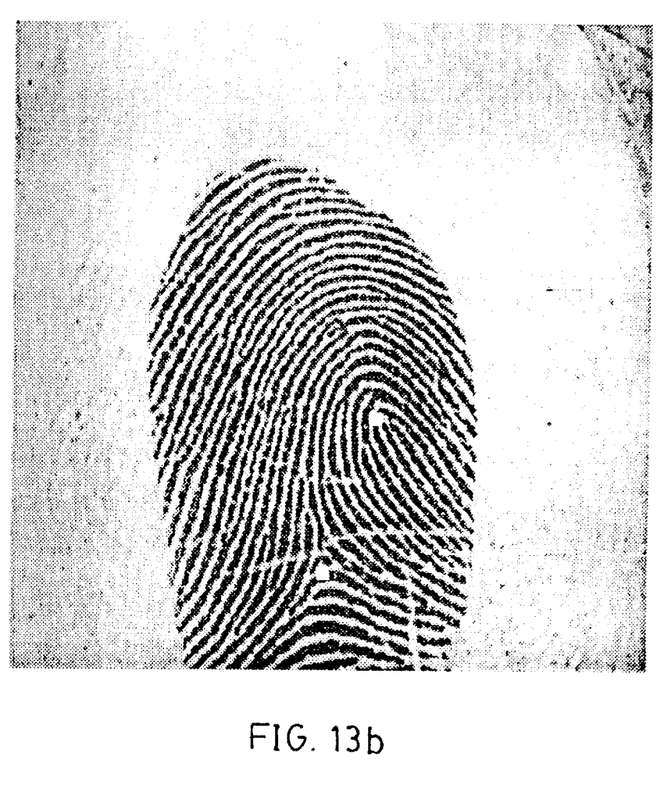
FIG. 13b shows block direction-flow image obtained after applying Step 1 and 2 of this invention.
Figure 13C:
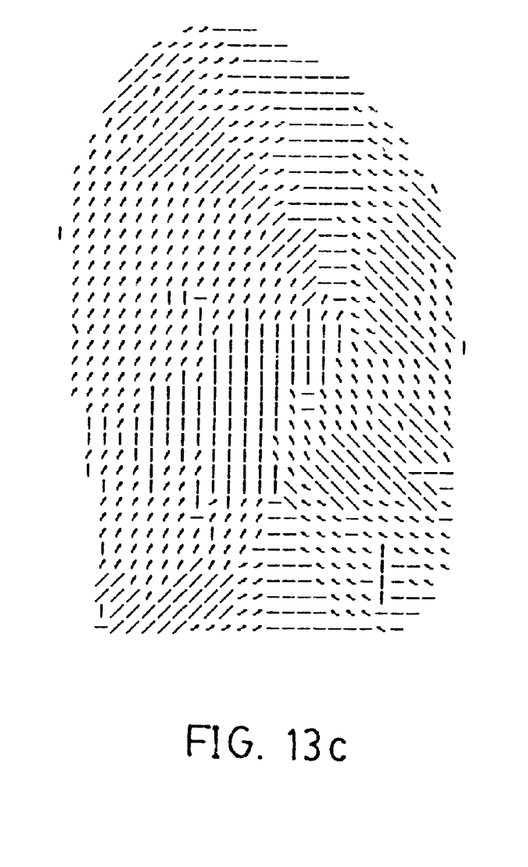
FIG. 13c shows block direction-flow image obtained after applying Step 3 of this invention, the core point and delta point positions obtained by Step 4 and 5 are indicated with inverse (color) block.
Figure 13D:
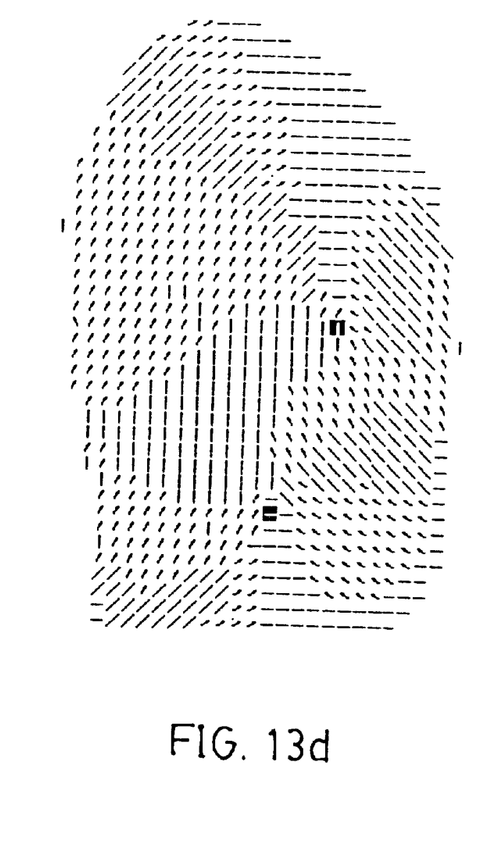
FIG. 13d indicates the core point and delta point on the original gray-level image.
Figure 14A:
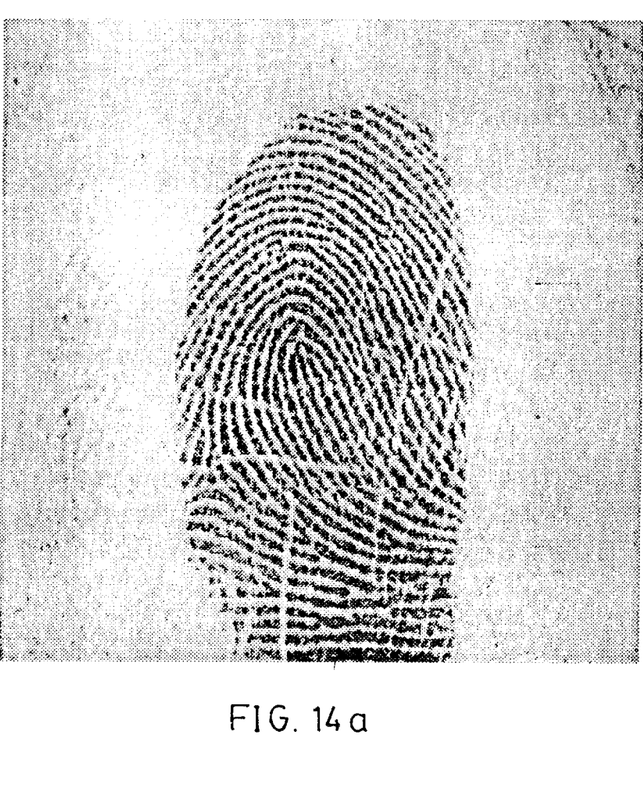
FIG. 14a shows third acquired image of fingerprint 1: original gray-level image.
Figure 14B:
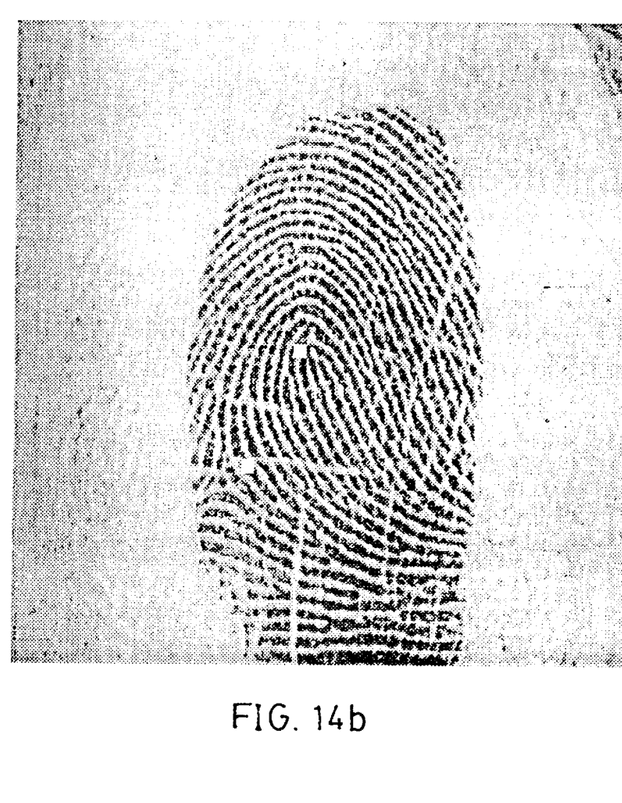
FIG. 14b shows block direction-flow image obtained after applying Step 1 and 2 of this invention.
Figure 14C:
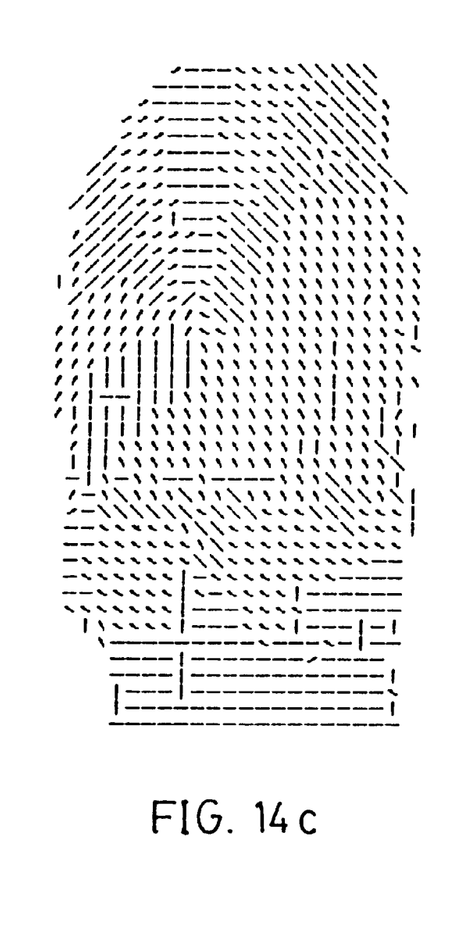
FIG. 14c shows block direction-flow image obtained after applying Step 3 of this invention, the core point and delta point positions obtained by Step 4 and 5 are indicated with inverse (color) block.
Figure 14D:
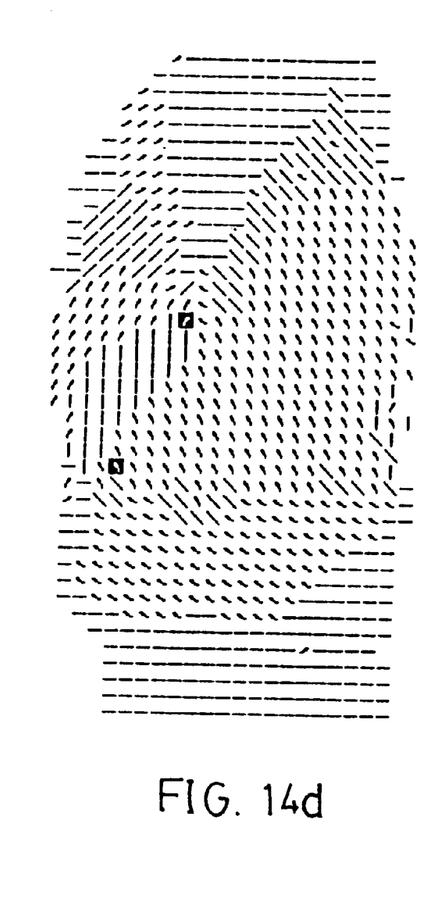
FIG. 14d indicates the core point and delta point on the original gray-level image.

It is necessary to consider the two situations shown in FIG. 10 and FIG. 11 in analyzing the direction flow around the core points. In FIG. 10, the convex upward characteristics resembles the delta characteristics but the R3 region can be ignored. FIG. 11 shows a concave inward distribution characteristics which is symmetrical to that in FIG. 10.

The method to locate the core point in this invention is described in following six steps:

Step 1: From observation, the fingerprint direction flow has a greater variation, therefore the first step is to determine whether the two neighboring regions have sufficient variations. The consideration is illustrated below:

| Left neighboring region | | Right neighboring region |
|---|---|---|
| BDI(p, q − 1) | BDI(p, q) | BDI(p, q + 1) |

Definition θ=|BDI(p,q−1)−BDI(p,q+1)|     (5)

The candidate core points are restricted to the condition $$\theta \geq \frac{\pi}{4}$$

Step 2: With block (p, q) as the center, take a 5×5 block-region as shown in FIG. 3. Since the angular variation as considerably large in regions around the cores, it will not be constrained in a small range. As such, use Eq. (4) to determine the distribution of $\overline{H}^{45°}(R_{5\times5}(p,q))$ and calculate $$A = \hbar_i^{45°} = MAX\overline{H}^{45°} = Max\{\hbar_d^{45°}|d=0, 1, \ldots, N-1\} \quad (6)$$

The rest of the steps will be carried only if A≦threshold$_3$ (a pre-defined value).

Step 3: Next, examine the 5×5 block-region which has (p, q) as the center forming the convex or concave shape as shown in FIGS. 10 and 11. That is, find the number of left skew in region R1, Left(R1)
the number of right skew in region R2, Right(R2)
the number of right skew in region R4, Right(R4)
the number of left skew in region R5, Left(R5)
then make decision based on the following:

If (Left(R1)+Right(R2))>(Right(R4)+Left(R5)) and Min (Left(R1), Right(R2))≧threshold$_4$ (a pre-defined value) then (p, q) is the center of the convex region.

If (Left(R1)+Right(R2))<(Right(R4)+Left(R5)) and Min (Right(R4), Left(R5))≧threshold$_4$ then (p, q) is the center of the concave region.

Step 4: As the convex shape is similar to the delta shape, it is necessary to eliminate the information around the delta that may contribute to a candidate core point. This is to avoid repeated calculations and mistaking a delta point as a core point.

Step 5: According to the convex and concave shapes and the point to point distances, the clustering of the candidate core points as found in Step 4 is determined. The method to determine the clustering is again the modified K-means algorithm as developed in this invention.

Step 6: Step 5 has determined the clustering of the candidate core points. Each cluster has to find a representing point to be regarded as the core point location. That is to process the convex and concave situations with the followings:

take the lowest point in the convex region to be the core point take the highest point in the concave region to be the core point From the above six steps, one to two core point locations of the fingerprint can be determined.

As described above, this invention is applicable on any direction-flow of static or dynamic fluid (gas or liquid), or solids with grainy strips (e.g. grain of wood and fingerprint) to identify the locations of some characteristic points. For the case of fingerprint, the characteristic points are the core points and the delta points. Therefore, even if the fingerprint is distorted to a certain extend due to stain, cuts or exerting different pressure or placing one's finger in different orientation during the acquisition of the fingerprint, by using the methods in this invention the core points and the delta points can still be located since the features of the direction-flow are still available.

To summarize, this invention can accurately locate the same core points and delta points of a fingerprint acquired in different time or conditions (see FIGS. 12 to 14). This invention has made a considerable contribution to the automatic fingerprint recognition by providing highly accurate coordinates of the high-level feature points to be superior to any conventional methods of automatic fingerprint recognition.

We claim:

1. A method to extract high level features of a gray level ridge flow image including the automatic determination of the location of the high level features including the core and delta points of a fingerprint image in the form of a gray level image, comprising the following five steps:

(1) determining a ridge flow direction of each gray level pixel of a fingerprint image and assign it with a direction code;
   (2) finding out a block directional flow and assigning each with appropriate direction code thereof;
   (3) correcting block flow directions in which a detection of the flow direction is affected by an input image quality in order to be immune from noises infiltrated during image acquiring process;
   (4) locating the delta points which are based on a corrected block direction flow diagram to locate from zero to a few delta points; and
   (5) locating the core points which are based on a corrected block direction flow diagram to locate one to two core points;

wherein the step of determining a ridge flow direction of each gray level pixel comprises the following steps:
   (1) window division, by dividing the gray level image respectively into 5×5, 7×7 and 9×9 pixel windows, each window associated to a pixel having an object pixel located at a center of the 5×5, 7×7 and 9×9 window, with 24, 48 and 80 neighboring pixels respectively disposed around the object pixel $g_{0,0}$, said windows arranged as:

5×5

| $g_{-2,-2}$ | $g_{-2,-1}$ | $g_{-2,0}$ | $g_{-2,1}$ | $g_{-2,2}$ |
|---|---|---|---|---|
| $g_{-1,-2}$ | $g_{-1,-1}$ | $g_{-1,0}$ | $g_{-1,1}$ | $g_{-1,2}$ |
| $g_{0,-2}$ | $g_{0,-1}$ | $g_{0,0}$ | $g_{0,1}$ | $g_{0,2}$ |
| $g_{1,-2}$ | $g_{1,-1}$ | $g_{1,0}$ | $g_{1,1}$ | $g_{1,2}$ |
| $g_{2,-2}$ | $g_{2,-1}$ | $g_{2,0}$ | $g_{2,1}$ | $g_{2,2}$ |

7×7

| $g_{-3,-3}$ | $g_{-3,-2}$ | $g_{-3,-1}$ | $g_{-3,0}$ | $g_{-3,1}$ | $g_{-3,2}$ | $g_{-3,3}$ |
|---|---|---|---|---|---|---|
| $g_{-2,-3}$ | $g_{-2,-2}$ | $g_{-2,-1}$ | $g_{-2,0}$ | $g_{-2,1}$ | $g_{-2,2}$ | $g_{-2,3}$ |
| $g_{-1,-3}$ | $g_{-1,-2}$ | $g_{-1,-1}$ | $g_{-1,0}$ | $g_{-1,1}$ | $g_{-1,2}$ | $g_{-1,3}$ |
| $g_{0,-3}$ | $g_{0,-2}$ | $g_{0,-1}$ | $g_{0,0}$ | $g_{0,1}$ | $g_{0,2}$ | $g_{0,3}$ |
| $g_{1,-3}$ | $g_{1,-2}$ | $g_{1,-1}$ | $g_{1,0}$ | $g_{1,1}$ | $g_{1,2}$ | $g_{1,3}$ |
| $g_{2,-3}$ | $g_{2,-2}$ | $g_{2,-1}$ | $g_{2,0}$ | $g_{2,1}$ | $g_{2,2}$ | $g_{2,3}$ |
| $g_{3,-3}$ | $g_{3,-2}$ | $g_{3,-1}$ | $g_{3,0}$ | $g_{3,1}$ | $g_{3,2}$ | $g_{3,3}$ |

9×9

| $g_{-4,-4}$ | $g_{-4,-3}$ | $g_{-4,-2}$ | $g_{-4,-1}$ | $g_{-4,0}$ | $g_{-4,1}$ | $g_{-4,2}$ | $g_{-4,3}$ | $g_{-4,4}$ |
|---|---|---|---|---|---|---|---|---|
| $g_{-3,-4}$ | $g_{-3,-3}$ | $g_{-3,-2}$ | $g_{-3,-1}$ | $g_{-3,0}$ | $g_{-3,1}$ | $g_{-3,2}$ | $g_{-3,3}$ | $g_{-3,4}$ |
| $g_{-2,-4}$ | $g_{-2,-3}$ | $g_{-2,-2}$ | $g_{-2,-1}$ | $g_{-2,0}$ | $g_{-2,1}$ | $g_{-2,2}$ | $g_{-2,3}$ | $g_{-2,4}$ |
| $g_{-1,-4}$ | $g_{-1,-3}$ | $g_{-1,-2}$ | $g_{-1,-1}$ | $g_{-1,0}$ | $g_{-1,1}$ | $g_{-1,2}$ | $g_{-1,3}$ | $g_{-1,4}$ |
| $g_{0,-4}$ | $g_{0,-3}$ | $g_{0,-2}$ | $g_{0,-1}$ | $g_{0,0}$ | $g_{0,1}$ | $g_{0,2}$ | $g_{0,3}$ | $g_{0,4}$ |
| $g_{1,-4}$ | $g_{1,-3}$ | $g_{1,-2}$ | $g_{1,-1}$ | $g_{1,0}$ | $g_{1,1}$ | $g_{1,2}$ | $g_{1,3}$ | $g_{1,4}$ |
| $g_{2,-4}$ | $g_{2,-3}$ | $g_{2,-2}$ | $g_{2,-1}$ | $g_{2,0}$ | $g_{2,1}$ | $g_{2,2}$ | $g_{2,3}$ | $g_{2,4}$ |
| $g_{3,-4}$ | $g_{3,-3}$ | $g_{3,-2}$ | $g_{3,-1}$ | $g_{3,0}$ | $g_{3,1}$ | $g_{3,2}$ | $g_{3,3}$ | $g_{3,4}$ |
| $g_{4,-4}$ | $g_{4,-3}$ | $g_{4,-2}$ | $g_{4,-1}$ | $g_{4,0}$ | $g_{4,1}$ | $g_{4,2}$ | $g_{4,3}$ | $g_{4,4}$ | each said window being calculated to generate set of gauging variance values for deciding the ridge flow direction of each gray level pixel;

(2) calculation, by performing calculation on each said window to generate set of gauging variance values for deciding the ridge flow direction of each gray level pixel, said calculation comprising a step of a convolution operation on each said gray level window in a 5×5, 7×7, and 9×9 direction mask respectively arranged as:

5×5

| $m_{-2,-2}$ | $m_{-2,-1}$ | $m_{-2,0}$ | $m_{-2,1}$ | $m_{-2,2}$ |
|---|---|---|---|---|
| $m_{-1,-2}$ | $m_{-1,-1}$ | $m_{-1,0}$ | $m_{-1,1}$ | $m_{-1,2}$ |
| $m_{0,-2}$ | $m_{0,-1}$ | $m_{0,0}$ | $m_{0,1}$ | $m_{0,2}$ |
| $m_{1,-2}$ | $m_{1,-1}$ | $m_{1,0}$ | $m_{1,1}$ | $m_{1,2}$ |
| $m_{2,-2}$ | $m_{2,-1}$ | $m_{2,0}$ | $m_{2,1}$ | $m_{2,2}$ |

7×7

| $m_{-3,-3}$ | $m_{-3,-2}$ | $m_{-3,-1}$ | $m_{-3,0}$ | $m_{-3,1}$ | $m_{-3,2}$ | $m_{-3,3}$ |
|---|---|---|---|---|---|---|
| $m_{-2,-3}$ | $m_{-2,-2}$ | $m_{-2,-1}$ | $m_{-2,0}$ | $m_{-2,1}$ | $m_{-2,2}$ | $m_{-2,3}$ |
| $m_{-1,-3}$ | $m_{-1,-2}$ | $m_{-1,-1}$ | $m_{-1,0}$ | $m_{-1,1}$ | $m_{-1,2}$ | $m_{-1,3}$ |
| $m_{0,-3}$ | $m_{0,-2}$ | $m_{0,-1}$ | $m_{0,0}$ | $m_{0,1}$ | $m_{0,2}$ | $m_{0,3}$ |
| $m_{1,-3}$ | $m_{1,-2}$ | $m_{1,-1}$ | $m_{1,0}$ | $m_{1,1}$ | $m_{1,2}$ | $m_{1,3}$ |
| $m_{2,-3}$ | $m_{2,-2}$ | $m_{2,-1}$ | $m_{2,0}$ | $m_{2,1}$ | $m_{2,2}$ | $m_{2,3}$ |
| $m_{3,-3}$ | $m_{3,-2}$ | $m_{3,-1}$ | $m_{3,0}$ | $m_{3,1}$ | $m_{3,2}$ | $m_{3,3}$ |

9×9

| $m_{-4,-4}$ | $m_{-4,-3}$ | $m_{-4,-2}$ | $m_{-4,-1}$ | $m_{-4,0}$ | $m_{-4,1}$ | $m_{-4,2}$ | $m_{-4,3}$ | $m_{-4,4}$ |
|---|---|---|---|---|---|---|---|---|
| $m_{-3,-4}$ | $m_{-3,-3}$ | $m_{-3,-2}$ | $m_{-3,-1}$ | $m_{-3,0}$ | $m_{-3,1}$ | $m_{-3,2}$ | $m_{-3,3}$ | $m_{-3,4}$ |
| $m_{-2,-4}$ | $m_{-2,-3}$ | $m_{-2,-2}$ | $m_{-2,-1}$ | $m_{-2,0}$ | $m_{-2,1}$ | $m_{-2,2}$ | $m_{-2,3}$ | $m_{-2,4}$ |
| $m_{-1,-4}$ | $m_{-1,-3}$ | $m_{-1,-2}$ | $m_{-1,-1}$ | $m_{-1,0}$ | $m_{-1,1}$ | $m_{-1,2}$ | $m_{-1,3}$ | $m_{-1,4}$ |
| $m_{0,-4}$ | $m_{0,-3}$ | $m_{0,-2}$ | $m_{0,-1}$ | $m_{0,0}$ | $m_{0,1}$ | $m_{0,2}$ | $m_{0,3}$ | $m_{0,4}$ |
| $m_{1,-4}$ | $m_{1,-3}$ | $m_{1,-2}$ | $m_{1,-1}$ | $m_{1,0}$ | $m_{1,1}$ | $m_{1,2}$ | $m_{1,3}$ | $m_{1,4}$ |
| $m_{2,-4}$ | $m_{2,-3}$ | $m_{2,-2}$ | $m_{2,-1}$ | $m_{2,0}$ | $m_{2,1}$ | $m_{2,2}$ | $m_{2,3}$ | $m_{2,4}$ |
| $m_{3,-4}$ | $m_{3,-3}$ | $m_{3,-2}$ | $m_{3,-1}$ | $m_{3,0}$ | $m_{3,1}$ | $m_{3,2}$ | $m_{3,3}$ | $m_{3,4}$ |
| $m_{4,-4}$ | $m_{4,-3}$ | $m_{4,-2}$ | $m_{4,-1}$ | $m_{4,0}$ | $m_{4,1}$ | $m_{4,2}$ | $m_{4,3}$ | $m_{4,4}$ | said gauging variance value for said object pixel $g_{0,0}$, calculated as follows:

$$V_{0,0} = \sum_{i=-k}^{k} \sum_{j=-k}^{k} m_{i,j}(g_{i,j} - g_{0,0})^2, \text{ where } k = 2, 3, \text{ or } 4$$

said direction mask respectively for 5×5, 7×7 and 9×9 masks corresponding to one of the eight directions, $d/8\pi$(d=0,1,2,3,4,5,6,7), arranged as follows:

for 5×5 masks $d = 0$
| 0 | 0 | 0 | 0 | 0 |
|---|---|---|---|---|
| 0 | 0 | 0 | 0 | 0 |
| 1 | 1 | 1 | 1 | 1 |
| 0 | 0 | 0 | 0 | 0 |
| 0 | 0 | 0 | 0 | 0 |

$d = 1$
| 0 | 0 | 0 | 0 | 0 |
|---|---|---|---|---|
| 0 | 0 | 0 | 1 | 1 |
| 0 | 0 | 1 | 0 | 0 |
| 1 | 1 | 0 | 0 | 0 |
| 0 | 0 | 0 | 0 | 0 |

$d = 2$
| 0 | 0 | 0 | 0 | 1 |
|---|---|---|---|---|
| 0 | 0 | 0 | 1 | 0 |
| 0 | 0 | 1 | 0 | 0 |
| 0 | 1 | 0 | 0 | 0 |
| 1 | 0 | 0 | 0 | 0 |

$d = 3$
| 0 | 0 | 0 | 1 | 0 |
|---|---|---|---|---|
| 0 | 0 | 0 | 1 | 0 |
| 0 | 0 | 1 | 0 | 0 |
| 0 | 1 | 0 | 0 | 0 |
| 0 | 1 | 0 | 0 | 0 |

$d = 4$
| 0 | 0 | 1 | 0 | 0 |
|---|---|---|---|---|
| 0 | 0 | 1 | 0 | 0 |
| 0 | 0 | 1 | 0 | 0 |
| 0 | 0 | 1 | 0 | 0 |
| 0 | 0 | 1 | 0 | 0 |

$d = 5$
| 0 | 1 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 1 | 0 |

$d = 6$
| 1 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 1 |

$d = 7$
| 0 | 0 | 0 | 0 | 0 |
|---|---|---|---|---|
| 1 | 1 | 0 | 0 | 0 |
| 0 | 0 | 1 | 0 | 0 |
| 0 | 0 | 0 | 1 | 1 |
| 0 | 0 | 0 | 0 | 0 | for 7×7 masks $d = 0$
| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 1 | 1 | 1 | 1 | 1 | 1 | 1 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

$d = 1$
| 0 | 0 | 0 | 0 | 0 | 0 | 0 |
|---|---|---|---|---|---|---|
| 0 | 0 | 0 | 0 | 0 | 0 | 1 |
| 0 | 0 | 0 | 0 | 0 | 1 | 0 |
| 0 | 0 | 1 | 1 | 1 | 0 | 0 |
| 0 | 1 | 0 | 0 | 0 | 0 | 0 |
| 1 | 0 | 0 | 0 | 0 | 0 | 0 |
| 0 | 0 | 0 | 0 | 0 | 0 | 0 |

$d = 2$
| 0 | 0 | 0 | 0 | 0 | 0 | 1 |
|---|---|---|---|---|---|---|
| 0 | 0 | 0 | 0 | 0 | 1 | 0 |
| 0 | 0 | 0 | 0 | 1 | 0 | 0 |
| 0 | 0 | 0 | 1 | 0 | 0 | 0 |
| 0 | 0 | 1 | 0 | 0 | 0 | 0 |
| 0 | 1 | 0 | 0 | 0 | 0 | 0 |
| 1 | 0 | 0 | 0 | 0 | 0 | 0 |

$d = 3$
| 0 | 0 | 0 | 0 | 1 | 0 |
|---|---|---|---|---|---|
| 0 | 0 | 0 | 0 | 1 | 0 | 0 |
| 0 | 0 | 0 | 1 | 0 | 0 | 0 |
| 0 | 0 | 0 | 1 | 0 | 0 | 0 |
| 0 | 0 | 1 | 0 | 0 | 0 | 0 |
| 0 | 1 | 0 | 0 | 0 | 0 | 0 |
| 0 | 1 | 0 | 0 | 0 | 0 | 0 |

$d = 4$
| 0 | 0 | 0 | 1 | 0 | 0 | 0 |
|---|---|---|---|---|---|---|
| 0 | 0 | 0 | 1 | 0 | 0 | 0 |
| 0 | 0 | 0 | 1 | 0 | 0 | 0 |
| 0 | 0 | 0 | 1 | 0 | 0 | 0 |
| 0 | 0 | 0 | 1 | 0 | 0 | 0 |
| 0 | 0 | 0 | 1 | 0 | 0 | 0 |
| 0 | 0 | 0 | 1 | 0 | 0 | 0 |

$d = 5$
| 0 | 1 | 0 | 0 | 0 | 0 | 0 |
|---|---|---|---|---|---|---|
| 0 | 0 | 1 | 0 | 0 | 0 | 0 |
| 0 | 0 | 1 | 0 | 0 | 0 | 0 |
| 0 | 0 | 0 | 1 | 0 | 0 | 0 |
| 0 | 0 | 0 | 0 | 1 | 0 | 0 |
| 0 | 0 | 0 | 0 | 1 | 0 | 0 |
| 0 | 0 | 0 | 0 | 0 | 1 | 0 |

$d = 6$
| 1 | 0 | 0 | 0 | 0 | 0 | 0 |
|---|---|---|---|---|---|---|
| 0 | 1 | 0 | 0 | 0 | 0 | 0 |
| 0 | 0 | 1 | 0 | 0 | 0 | 0 |
| 0 | 0 | 0 | 1 | 0 | 0 | 0 |
| 0 | 0 | 0 | 0 | 1 | 0 | 0 |
| 0 | 0 | 0 | 0 | 0 | 1 | 0 |
| 0 | 0 | 0 | 0 | 0 | 0 | 1 |

$d = 7$
| 0 | 0 | 0 | 0 | 0 | 0 | 0 |
|---|---|---|---|---|---|---|
| 1 | 0 | 0 | 0 | 0 | 0 | 0 |
| 0 | 1 | 0 | 0 | 0 | 0 | 0 |
| 0 | 0 | 1 | 1 | 1 | 0 | 0 |
| 0 | 0 | 0 | 0 | 1 | 0 | 0 |
| 0 | 0 | 0 | 0 | 0 | 1 | 0 |
| 0 | 0 | 0 | 0 | 0 | 0 | 0 | for 9×9 masks $d = 0$
| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 1 | 1 | 1 | 1 | 1 | 1 | 1 | 1 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

-continued

|0|0|0|0|0|0|0|0|0|
|0|0|0|0|0|0|0|0|0|
|0|0|0|0|0|0|0|1|1|
|0|0|0|0|0|1|1|0|0|
|0|0|0|0|1|0|0|0|0|
|0|0|1|1|0|0|0|0|0|
|1|1|0|0|0|0|0|0|0|
|0|0|0|0|0|0|0|0|0|
|0|0|0|0|0|0|0|0|0|

$d = 1$

|0|0|0|0|0|0|0|0|1|
|0|0|0|0|0|0|0|1|0|
|0|0|0|0|0|0|1|0|0|
|0|0|0|0|0|1|0|0|0|
|0|0|0|0|1|0|0|0|0|
|0|0|0|1|0|0|0|0|0|
|0|0|1|0|0|0|0|0|0|
|0|1|0|0|0|0|0|0|0|
|1|0|0|0|0|0|0|0|0|

$d = 2$

|0|0|0|0|0|0|1|0|0|
|0|0|0|0|0|0|1|0|0|
|0|0|0|0|0|1|0|0|0|
|0|0|0|0|0|1|0|0|0|
|0|0|0|0|1|0|0|0|0|
|0|0|0|1|0|0|0|0|0|
|0|0|0|1|0|0|0|0|0|
|0|0|1|0|0|0|0|0|0|
|0|0|1|0|0|0|0|0|0|

$d = 3$

|0|0|0|0|1|0|0|0|0|
|0|0|0|0|1|0|0|0|0|
|0|0|0|0|1|0|0|0|0|
|0|0|0|0|1|0|0|0|0|
|0|0|0|0|1|0|0|0|0|
|0|0|0|0|1|0|0|0|0|
|0|0|0|0|1|0|0|0|0|
|0|0|0|0|1|0|0|0|0|
|0|0|0|0|1|0|0|0|0|

$d = 4$

-continued

|0|0|1|0|0|0|0|0|0|
|0|0|1|0|0|0|0|0|0|
|0|0|0|1|0|0|0|0|0|
|0|0|0|1|0|0|0|0|0|
|0|0|0|0|1|0|0|0|0|
|0|0|0|0|0|1|0|0|0|
|0|0|0|0|0|1|0|0|0|
|0|0|0|0|0|0|1|0|0|
|0|0|0|0|0|0|1|0|0|

$d = 5$

|1|0|0|0|0|0|0|0|0|
|0|1|0|0|0|0|0|0|0|
|0|0|1|0|0|0|0|0|0|
|0|0|0|1|0|0|0|0|0|
|0|0|0|0|1|0|0|0|0|
|0|0|0|0|0|1|0|0|0|
|0|0|0|0|0|0|1|0|0|
|0|0|0|0|0|0|0|1|0|
|0|0|0|0|0|0|0|0|1|

$d = 6$

|0|0|0|0|0|0|0|0|0|
|0|0|0|0|0|0|0|0|0|
|1|1|0|0|0|0|0|0|0|
|0|0|1|1|0|0|0|0|0|
|0|0|0|0|1|0|0|0|0|
|0|0|0|0|0|1|1|0|0|
|0|0|0|0|0|0|0|1|1|
|0|0|0|0|0|0|0|0|0|
|0|0|0|0|0|0|0|0|0|

$d = 7$ and (3) direction assignment, by deciding the flow direction of each gray level pixel presented by one of the said windows and assigning the flow direction with a corresponding direction code, said direction assignment including convolution operations with eight 5×5, 7×7 and 9×9 direction masks on each of the said windows and assigning the object pixel a direction code in accordance with the smallest gauging variance value obtained thereof; the direction code ranging from 0 to 7.

2. A method as claimed in claim 1, wherein the step of finding out the block directional flow and assigning each with appropriate direction code comprises the following steps:

(1) block division, by dividing the gray level image into 8×8 grid blocks, each constituted by a number of gray level pixels;

(2) statistical calculation, by performing calculation on each of the said blocks to generate set of likelihood values for deciding the flow direction of each block, including determining a frequency of each of the eight directions within each said grid block; and (3) direction assignment, by deciding the flow direction of each of the said blocks and assigning it with a corresponding direction code, including the statistical calculation on each said grid block by determining the frequency of each of the eight directions within each said grid block to assign the object grid block with the direction having the highest frequency among those obtained in the said statistical calculation; the assigned direction codes ranging from 0 to 7.

3. A method as claimed in claim 1, wherein the step of correcting the block direction flows comprises the following steps:

(1) checking for abrupt changes of the said block direction flows between neighboring grid blocks including the comparison between grid blocks (p,q) and (p,q−1);

(2) statistical calculation for each said grid blocks, (p,q) defining a 5×5 block-region having (p,q) as the center and determining the frequencies of the eight directions within the said 5×5 region;

(3) angular calculation with the results of direction distributions $\hat{H}$ from the last step, determining the direction distributions $\hat{H}^{45'}$ within any $\pi/4$ sector; and (4) correcting as based on the results obtained in the above steps (1) to (3), deciding whether if the direction of the object grid block has to be corrected, whereby if correction is needed, the direction with the highest frequency as determined in step (2) is assigned to the object grid block.

4. A method as claimed in claim 1, wherein the step of locating the delta points comprises the following steps:

(1) initial filtering—for each grid block (p,q), based on the corrected block directions of the grid blocks (p−1,q−1), (p,q) and (p−1,q+1), determine if a delta can be located around (p,q);

(2) secondary filtering—for each grid block (p,q), defining a 5×5 block-region with (p,q) as the center, determining the frequencies of the block directions of the grid blocks which fall between the range of $\pi/4$ and $3\pi/4$ within the 5×5 block-region, whereby if the frequencies are low, the angle is too large and thus cannot form a delta point;

(3) extended analysis as similar to the step (2), defining the 5×5 block-regions and dividing each of them into three sub-regions and determining whether these three sub-regions can form a delta point;

(4) clustering with the candidate delta points found in step (3), determining the cluster distributions based on the distance between the candidate delta points; and delta point allocation by determining a point within each cluster and treat it as a delta point location, by selecting the point within the cluster which has a flow distribution closest to a delta and assuming it as a delta point, thereby obtaining zero to a few delta points; and wherein the step of extended analysis comprises the division of each the said 5×5 block-region into three sub-regions arranged as follows:

R1 having a left skew direction

R2 having a right skew direction

R3 having a horizontal direction.

5. A method as claimed in claim 1, wherein the step of locating the core points comprises the following steps:

(1) initial filtering—for each grid block (p,q), based on the corrected block directions of the grid blocks (p−1, q−1), and (p−1, q+1), determining if a core point can be located around (p,q);

(2) secondary filtering for each grid block (p,q), defining a 5×5 block-region with (p,q) as the center, determining the frequencies of the block directions of the grid blocks which fall between the range of $\pi/4$ and $3\pi/4$ within the 5×5 block-region, whereby if the frequency is low, the angle is too large and thus cannot form a core point;

(3) extended analysis as similar to the step (2), defining the 5×5 block-region with (p,q) as the center, determining if a concave or convex shape is formed around (p,q);

(4) removal of unlikely candidates by removing the convex candidates which are already identified as the delta points;

(5) clustering from the candidate core points found in step (3), applying the modified K-means clustering method to find the clustering of the candidate core points;

(6) core point allocation from the clusters of candidate core points, determining the locations of the core points, wherein for the cluster with a convex shape, the lowest point is taken as the core point; for the cluster with a concave shape, the highest point is taken as the core point, thereby determining one or two core points of a fingerprint; and wherein the step of determining if one of the said 5×5 block-regions is a concave or convex shape is based on the followings:

if R1 having a left skew direction and R2 having a right skew direction, then the region is a convex region;

if R4 having a right skew direction and R5 having a left skew direction, then the region is a concave region.

* * * * *